March 8, 1949.　　　　L. BLOCH　　　　2,464,018

WASTE FITTING

Filed Feb. 13, 1946

INVENTOR.
Leon Bloch
BY Frank S. Greene
ATTORNEY

Patented Mar. 8, 1949

2,464,018

UNITED STATES PATENT OFFICE 2,464,018

WASTE FITTING

Leon Bloch, Cleveland, Ohio

Application February 13, 1946, Serial No. 647,304

1 Claim. (Cl. 4—287)

This invention relates to waste pipe fittings and more particularly to a combined strainer and plug for use in connection with sinks and similar fixtures. Various waste fittings for sinks are in common use in which a plug valve can be lifted to an open position to permit draining and in which means is provided for supporting the plug in open position when it is lifted and turned about its axis. To shift such plugs to open position it is necessary to grasp, lift and turn the plug in order to shift the valve from closed position to draining position and when a sink is full or partially full of water it is necessary to insert a hand into the water in order to shift a plug to draining position.

The present invention has for its object to provide a simple and inexpensive waste fitting in which the drain plug is so mounted that it can be moved to open position by a lateral push on its stem so that a person may conveniently shift the plug to draining position by using a knife, fork or spoon to push the plug to open position and thereby avoid wetting the hand.

It is also an object of the invention to provide a simple and inexpensive fitting in the form of a strainer and plug unit which can be removed from the sink outlet by simply lifting it out.

With the above and other objects in view the invention may be said to comprise the fitting as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
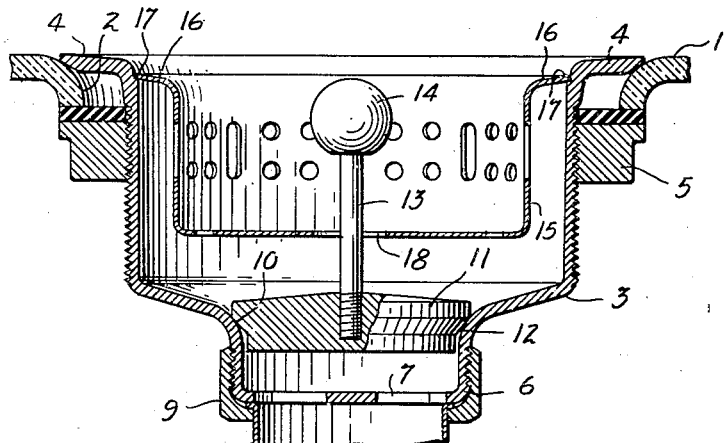
Fig. 1 is a vertical axial section through a fitting embodying the invention.
Figure 2:
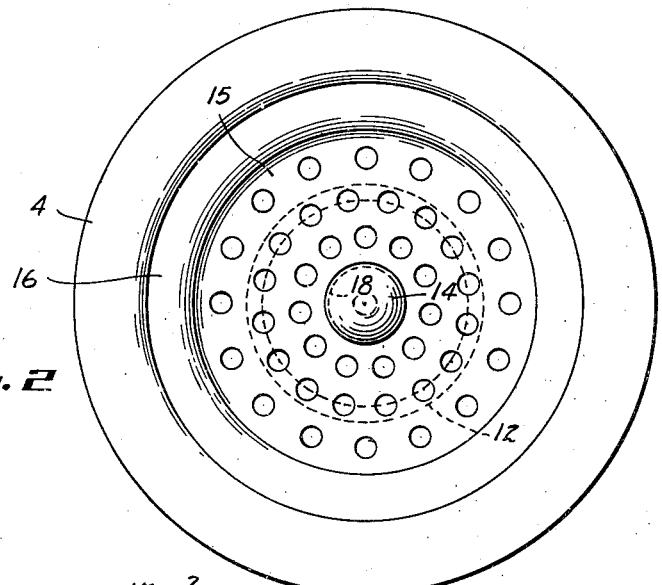
Fig. 2 is a top plan view of the fitting.

In the accompanying drawings the fitting of the present invention is shown applied to a sink outlet, the sink having a bottom I provided with an outlet opening 2 in which is mounted a coupling member 3 that has an upper flange 4 resting upon the bottom I at the margin of the opening 2 and which is clamped in position in the opening by means of a nut 5 threaded upon the exterior of the member 3 and clamping a portion of the bottom I at the margin of the opening against the flange 4 of the coupling member. The coupling member 3 has a reduced lower end 6 which is provided with a strainer 7 and which is attached to a waste pipe 8 by means of a suitable threaded coupling 9.

Figure 3:
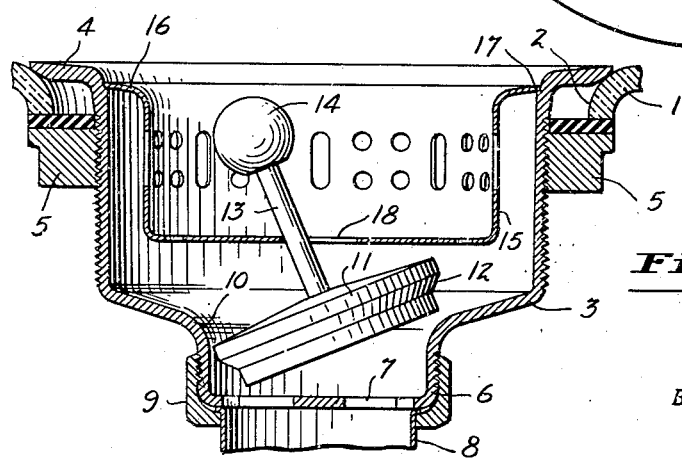
Fig. 3 is a sectional view similar to Fig. 1, showing the plug in draining position.

The coupling member 3 which is substantially cup-shaped provides a well at the sink outlet and has a rounded downwardly tapering shoulder 10 at the upper end of the reduced portion 6 which serves as a seat for a plug valve 11 which is provided with a tapering shoulder 12 at its periphery that seats upon the rounded tapering shoulder 10 of the coupling member. The plug 11 serves to close the outlet to the waste pipe when seated upon the shoulder 10. The plug valve 11 has a central axially extending stem 13 that is rigidly attached thereto and which projects upwardly. The valve 11 is so constructed that its center of gravity is above its points of contact with the seat 10 so that when the plug valve 11 is tilted laterally in any direction on the seat 10, the center of gravity of the valve will be lowered and shifted to one side of the vertical axis of the coupling member so that the valve will be retained in its tilted position as shown in Fig. 3 of the drawings. The stem 13 may have a knob 14 attached to its upper end which will assist in holding the valve by gravity in its open position.

A strainer 15 is preferably provided above the plug valve 11. This strainer is cup-shaped and has a peripheral flange 16 at its upper edge which is supported upon a shoulder 17 upon the interior of the coupling member 3 adjacent its upper end. The strainer 15 has a central opening 18 in its bottom that receives the stem 13 and that is of a diameter sufficient to permit the necessary tilting movement of the stem 13 in any direction.

The slope of the seating portion 12 of the plug 11 is preferably somewhat greater than the slope of the seat 10 of the coupling member so that the plug valve 11 can be readily tilted on the seat 10. The valve 11 can be easily tilted by simply pushing laterally in any direction on the stem 13 and when once tilted the plug valve will remain in the tilted draining position because of the fact that the center of gravity of the valve is lowered when shifted to one side of the diametrically opposite points of contact of the plug 11 with the seat 10 so that force is required to return the valve to its upright closed position and the valve will be held in draining position by gravity. To return the valve to closed position it is merely necessary to move the stem 13 back to upright position. Since the stem 13 can be readily engaged by a suitable implement such as a knife, fork or spoon and pushed laterally to move the valve to draining position or to return it to upright closed position, it is unnecessary for a person desiring to drain water from the sink to insert a hand into the water.

It is to be understood that variations and modifications of the specific devices herein shown and described for purposes of illustration may be made without departing from the spirit of the invention.

What I claim is:

A combined strainer and valve unit for sink outlet wells that have an opening in the bottom thereof provided with a downwardly tapering marginal valve seat, said unit comprising a valve that has a plug provided with a downwardly tapering periphery rockably engageable with said seat and a rigidly attached upwardly extending stem, and an open top cup-shaped strainer in the well above said plug and having an opening in its bottom through which said stem projects that is of a size to accommodate and limit the lateral movements of the stem when the valve is rocked on said seat from a closed position to a draining position, whereby the valve may be moved to draining position by pressing laterally against said stem.

LEON BLOCH.

REFERENCES CITED

The following references are of record in the file of this patent:

UNITED STATES PATENTS

| Number | Name | Date |
| --- | --- | --- |
| 1,104,315 | Renner | July 21, 1914 |
| 1,173,798 | Groom | Feb. 29, 1916 |
| 2,197,083 | Schaible | Apr. 16, 1940 |